3,262,952
REACTION PRODUCTS OF CASTOR OIL WITH ARYLENEDIISOCYANATES
Malcolm Kent Smith, Westfield, N.J., assignor to The Baker Castor Oil Company, Jersey City, N.J., a corporation of New Jersey
No Drawing. Filed Oct. 23, 1961, Ser. No. 147,071
3 Claims. (Cl. 260—404.5)

This invention relates to plasticizing agents and particularly to polymerized castor oil for polymeric systems, especially for nitrocellulose.

Polymerized castor oil has previously been prepared by oxidation at elevated temperatures to produce "blown" or "oxidized" castor oil. As oxidation progresses, the viscosity of the oil increases. By selecting the time and temperature of such processing, it was possible to obtain viscosities ranging from slightly above that of castor oil to exceedingly high viscosities, or even a gelled product.

However, blown castor oil was not completely satisfactory for many uses, such as plasticizing agents, in that considerable chemical decomposition of the castor oil occurred during the oxidizing process and, more importantly the blown oil and the compositions made with them, continued to increase in viscosity during storage, even when stored in sealed containers. Also, polymerizing castor oil by oxidation resulted in increased acid values, which is undesirable since the castor oil is more chemically reactive and causes corrosion.

The advantages of polymerizing drying and semi-drying oils by heat instead of oxidation is well known, but efforts to obtain polymers of castor oil by heating to elevated temperatures without the use of air, such as under a vacuum or inert gas, have proved unsuccessful. Since castor oil is a non-drying oil, bodying it by straight heat application is not feasible. Chemical dehydration of the castor oil normally occurs before polymerization results.

In accordance with the present invention, a polymerized castor oil is provided, which has viscosity properties similar to commercial blown or oxidized castor oil, but which has not been chemically degraded during processing. Further, the polymerized castor oil of the present invention has a low acid value and maintains a stable viscosity during storage. Additionally, the iodine value of the castor oil polymerized in accordance with the present invention is maintained substantially constant, whereas the iodine value of blown castor oil is reduced as the viscosity is increased. Also, the blown castor oils substantially increase in saponification values, whereas in the polymerized castor oils made in accordance with the present invention the saponification values drop slightly.

Further, with the present invention, since the polymerization of the castor oil occurs at a lower temperature than that heretofore used in producing blown castor oil, heating costs are decreased and the daily capacity of production is increased because losses through evaporation are reduced. Oils bodied at lower temperatures are lighter in color than oils bodied at higher temperatures. Lighter color oils are more desirable commercially than the darker oils.

The polymerized oil of this invention is prepared chemically by adding to castor oil predetermined quantities of an arylene diisocyanate, e.g. tolylene diisocyanate, hereinafter designated TDI, which promotes polymerization of the castor oil by chemical cross linking, which results from the reaction of the TDI with the hydroxyl groups present in the castor oil triglyceride. The castor oil polymerized by reaction with TDI or other arylene diisocyanate has the desirable compatibility and plasticizer features of blown castor oil, but possesses viscosity stability during storage. It has been found that even a highly polymerized castor oil made by reacting castor oil with an arylene diisocyanate such as TDI can be stored for a year or more with essentially no increase in viscosity. Additionally, it has been found that plasticized compositions made with polymerized castor oil of this invention maintain their original consistency.

The products of this invention may be prepared by heating castor oil to within the range of 70–100° C., preferably about 70° C., agitating the oil and slowly adding to the agitated oil the amount of TDI or other arylene diisocyanate required to give the desired viscosity. The arylene diisocyanate may range from about 2 parts to about 14 parts by weight based upon the combined weight of the isocyanate and castor oil. A preferred range is between about 4 and about 9 parts by weight of arylene diisocyanate such as TDI.

The range of viscosity increments which can be obtained by reacting castor oil with indicated amounts of an organic diisocyanate are as follows:

| Percent TDI: | Viscosity of castor oil at 100° C., Engler, sec. |
|---|---|
| 0 | 140–150 |
| 4.35 | 330–360 |
| 7.9 | 900–1000 |
| 8.9 | 1200–1400 |
| 10.5 | 3700–4400 |
| 11.7 | 10,000–14,000 |

These levels of reaction were selected because the resulting products have viscosity ranges of blown castor oils found most useful commercially in this country.

While tolylene diisocyanate is preferred, other arylene diisocyanates may be utilized. In general, arylene diisocyanates, as represented by the diisocyanates of the benzene and naphthalene series, or mixtures of these compounds, may be employed. In addition to the arylene diisocyanate recited in Examples 1 and 2, other useful diisocyanates are: m-phenylene diisocyanate, 1-chlorophenylene-2,4-diisocyanate, xenylene-4,4'-diisocyanate, naphthalene-1,5-diisocyanate, 3,3'-bitolylene-4,4'-diisocyanate, and diphenylene-4,4'-diisocyanate.

A mixture of TDI isomers currently commercially available consists of 80% 2,4-tolylene diisocyanate and 20% 2,6-tolylene diisocyanate and are satisfactory for this reaction. The reaction is normally completed within two hours.

The diisocyanate polymerized castor oils produced in accordance with this invention have the viscosity of blown castor oils but maintain stable viscosity during storage. Other superior attributes of diisocyanate polymerized castor oil are that they have very low acid values, generally below 2.0, which are not obtained by polymerization by oxidation. The acid value of an average batch of castor oil is normally about 2.0.

Further, iodine value of the castor oil polymerized by TDI remains substantially constant, at about 86.0, whereas in blown castor oils this property decreases steadily. Additionally, polymerized castor oils made in accordance with this invention have a minor drop in saponification value as contrasted to a substantial increase in blown castor oil. Essentially these properties indicate that no chemical degradation occurs during processing, and that only chemical combination occurs in the reaction between the castor oil and the diisocyanate.

The following examples are illustrative of this invention. All parts are by weight.

*Example 1*

In a container, 26 grams of a commercial mixture of tolylene diisocyanate, comprising about 80% 2,4-tolylene diisocyanate and about 20% 2,6-tolylene diisocyanate, was gradually introduced into 680 grams of #1 castor oil. The reactants were heated to 70° C. for 2 hours after which the heating was discontinued and the resultant product packaged in tin cans. The acid value of the polymerized oil was 1.3 and its iodine value was 86. For blown castor oil of the same color and viscosity, the acid value is 5 and the iodine value is 80.

Using the above procedure, a series of reactions was run in which the ratio of castor oil to the same tolylene diisocyanate was varied. The following table lists some of the ratios used and the viscosities of the resultant products as determined on a Brookfield HV Viscometer after the resultant products had aged one day at room temperature.

| Castor Oil, percent | Tolylene Diisocyanate, percent | Viscosity at 25° C., cps. |
|---|---|---|
| 96.3 | 3.7 | 2,490 |
| 94.5 | 5.5 | 4,640 |
| 93.9 | 6.1 | 5,740 |
| 92.9 | 7.1 | 9,380 |
| 92.1 | 7.9 | 13,460 |
| 91.3 | 8.7 | 22,480 |
| 90.6 | 9.4 | 29,520 |
| 89.7 | 10.3 | 56,350 |
| 87.1 | 12.9 | 1,136,000 |

*Example 2*

Tolylene diisocyanate in three different proportions was added to castor oil and mixed together at room temperature. The mixtures were agitated for one-half hour and allowed to react. The reactants were heated to 70° C. and maintained at this temperature for 2 hours while the mixtures were agitated. The samples were then packaged in tin cans.

The following table lists the ratios used and viscosities attained:

| | Castor Oil, percent | Tolylene Diisocyanate, percent | Viscosity at 25° C., cps. | Acid Value | Iodine Value |
|---|---|---|---|---|---|
| (a) | 96.0 | 4.0 | 2,500 | 1.2 | 85 |
| (b) | 92.2 | 7.8 | 11,490 | 1.0 | 86 |
| (c) | 91.2 | 8.8 | 20,300 | 0.9 | 85 |

The acid and iodine values of blown castor oils having the same viscosity and color of Examples (a) through (c) above are respectively as follows:

| | Acid Value | Iodine Value |
|---|---|---|
| (a) | 17 | 65 |
| (b) | 19 | 55 |
| (c) | 24 | 50 |

The plasticizing properties imparted to nitrocellulose by these chemically polymerized castor oils are similar to those imparted by their blown castor oil counterparts of equivalent viscosity and color. The following comparisons were made plasticizing 70 parts of nitrocellulose (15–20 sec.) with 30 parts of the indicated plasticizer.

In the following flexibility tests the results are stated as a pair of sequential numbers separated by a /. The mandrel tests for flexibility consist of bending the test film around mandrels of regularly decreasing diameters until the film fails by cracking. The mandrels vary in diameter by decreasing regular intervals from 1 inch down to 1/8 inch. Mandrel No. 1 is the 1-inch mandrel, and mandrel No. 10 is the 1/8 inch mandrel. The No. 10 mandrel hence imparts the sharpest bend and therefore subjects the film to the most severe test of flexibility. In the results below the digit before the / indicates the largest mandrel number which the film could be bent around without cracking, and the digit following the / represents the first mandrel on which cracking occurs. Thus, in general, the lower sets of digits indicate lower tolerance against flexing and the higher sets indicate high ability to flex.

*Table I*

| Engler Visc. | 330–360 | | 950–1,050 | | 1,200–1,400 | |
|---|---|---|---|---|---|---|
| Plasticizer | TDI Oil | Blown Oil | TDI Oil | Blown Oil | TDI Oil | Blown Oil |
| Film Properties (after 15 min. bake at 212° F.): Flexibility (mandrel)— #Pass/#Failure | 3/4 | 3/4 | 4/5 | 4/5 | 4/5 | 3/4 |
| Hardness (Sward) | 54 | 54 | 54 | 50 | 56 | 32 |

In another series of tests, nitrocellulose of one-half second viscosity was used, 67 parts being plasticized with 33 parts of the indicated plasticizers.

*Table II*

| Engler Visc. | | 330–360 | | 950–1,050 | | 1,200–1,400 | |
|---|---|---|---|---|---|---|---|
| Plasticizer | | TDI Oil | Blown Oil | TDI Oil | Blown Oil | TDI Oil | Blown Oil |
| Film Properties: Spew (2 hrs. at 212° F.) | | No | No | No | No | No | No |
| | Hours | | | | | | |
| Weather-O-meter Exposure—Mandrel flexibility. | 0 | 10/10 | 10/10 | 10/10 | 10/10 | 10/10 | 10/10 |
| | 50 | 5/6 | 4/5 | 4/5 | 6/8 | 2/3 | 4/5 |
| | 100 | 1/2 | 1/2 | 0/2 | 1/2 | 1/2 | 2/3 |
| | 150 | 0/1 | 0/1 | 0/1 | 0/1 | 0/1 | 1/2 |

From the above description, it will be evident that this invention provides polymerized castor oils which are fully equivalent to blown castor oil without the chemical degradation normally occurring during the oxidizing process. The polymerized castor oil produced in accordance with the present invention is especially useful as a plasticizer for nitrocellulose. These polymerized oils have considerable advantage of viscosity stability, have a low acid value, maintain the desired iodine value, and are light in color. The use of the polymerized castor oil prepared in accordance with the present invention as a plasticizer produces a plasticized composition which maintains its original consistency. Therefore, the use of plasticized compositions prepared from the polymerized castor oil of this invention has clearly demonstrated the superiority of these preparations over the products made with blown castor oil.

While certain present preferred embodiments of the invention have been illustrated and described, it is to be understood the invention may be otherwise embodied within the spirit thereof within the scope of the accompanying claims.

What is claimed is:

1. The reaction product of castor oil and from about 3 to about 13 parts by weight of an arylene diisocyanate, based on the combined weight of the castor oil and the diisocyanate, said arylene diisocyanate being selected from the class consisting of tolylene diisocyanate, m-phenylene diisocyanate, 1-chlorophenylene-2,4-diisocyanate, xenylene-4,4'-diisocyanate, naphthalene-1,5-diisocyanate, 3,3'-bitolylene-4,4'-diisocyanate and diphenylene-4,4'-diisocyanate, the temperature of reaction producing said product being below about 100° C.

2. The reaction product according to claim 1 wherein the arylene diisocyanate is tolylene diisocyanate.

3. The reaction product of castor oil and from about 4 to about 9 parts by weight of tolylene diisocyanate, based on the combined weight of castor oil and the diisocyanate, said reaction product having a viscosity at 25° C. cps. in the range of about 2,500 to about 20,300, the temperature of reaction producing said product being below about 100° C.

References Cited by the Examiner

UNITED STATES PATENTS

| | | | |
|---|---|---|---|
| 2,310,867 | 2/1943 | Pitman | 106—195 |
| 2,787,601 | 4/1957 | Detrick | 260—404.5 |
| 2,895,844 | 7/1959 | Bader | 106—195 |
| 2,969,386 | 1/1961 | McElroy | 260—404.6 XR |
| 2,984,679 | 5/1961 | Ehrlich | 260—404.5 |
| 3,022,327 | 2/1962 | Waythomas | 260—404.5 |

OTHER REFERENCES

Bailey et al.: "Federation of Societies for Paint Technology Official Digest," vol. 32, No. 426, pp. 984–1001 (1960).

CHARLES B. PARKER, *Primary Examiner.*

T. E. LEVOW, *Examiner.*

R. N. JONES, ROBERT V. HINES, *Assistant Examiners.*